A. G. AHLGREN.
BAND BRAKE.
APPLICATION FILED JUNE 10, 1918.
1,297,531. Patented Mar. 18, 1919.
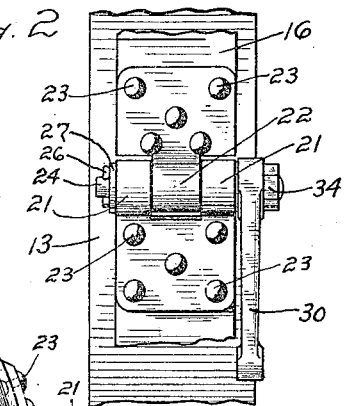
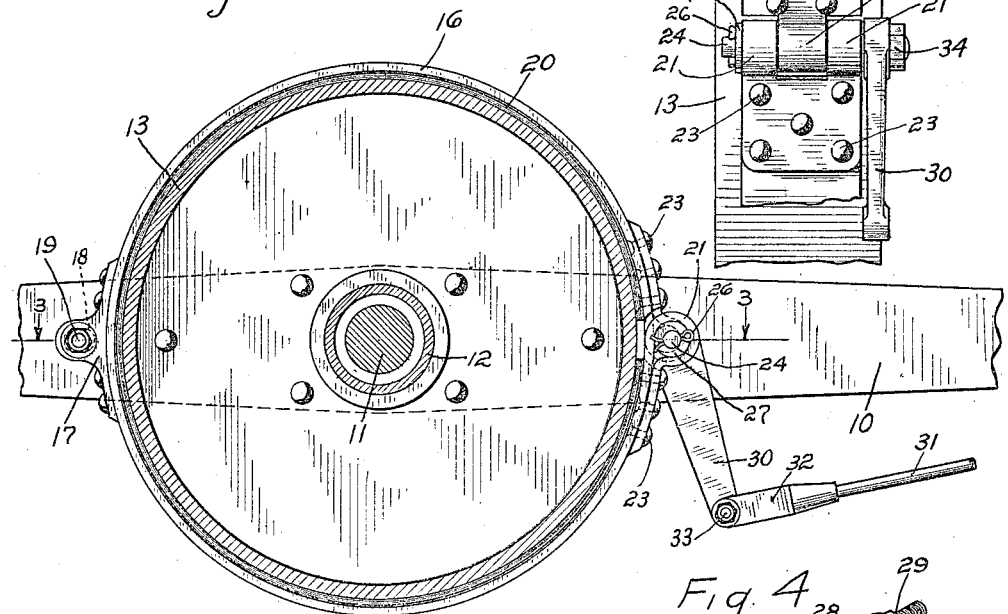
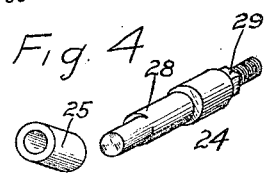
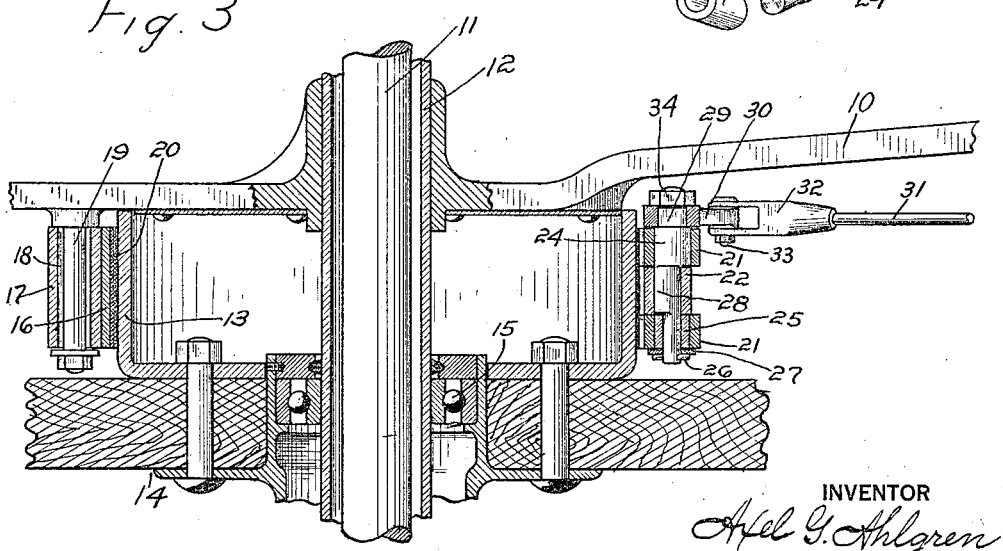
INVENTOR
Axel G. Ahlgren
BY
ATTORNEY

UNITED STATES PATENT OFFICE.

AXEL G. AHLGREN, OF BRIDGEPORT, CONNECTICUT.

BAND-BRAKE.

1,297,531. Specification of Letters Patent. Patented Mar. 18, 1919.

Application filed June 10, 1918. Serial No. 239,246.

*To all whom it may concern:*

Be it known that I, AXEL G. AHLGREN, a citizen of the United States, residing at Bridgeport, county of Fairfield, State of Connecticut, have invented an Improvement in Band-Brakes, of which the following is a specification.

This invention has for its object to provide a band brake especially adapted for automobiles, in which the number of parts shall be reduced to the minimum and be simple and inexpensive to make, thus minimizing the cost of production, and which shall be so constructed as to give greater leverage than in any brake heretofore known to the trade, thus insuring quick action and a powerful grip on the drum.

With these and other objects in view I have devised the novel brake of which the following description in connection with the accompanying drawing, forming a part thereof, is a specification, reference characters being used to indicate the several parts.

Figure 1 is a detail view showing one of the distance rods of an automobile in elevation, and the rear axle and brake drum in section, and showing my novel brake in operative position;

Fig. 2 a detail elevation as seen from the right in Fig. 1, the brake rod being removed;

Fig. 3 a horizontal section of an automobile wheel, and the brake drum and brake, the section line being indicated by 3—3 in Fig. 1, and Fig. 4 is a perspective view of the shaft and eccentric showing the bushing detached.

10 denotes one of the distance rods of an automobile, 11 the rear axle, 12 the axle tube, 13 the brake drum, 14 a wheel, the hub and two spokes appearing in section, and 15 the bearing, all of which parts may be of any ordinary or preferred construction.

16 denotes the brake band, at the midlength of which is a bracket 17 provided with an elongated opening 18 through which a stud 19 passes, the base of the stud being seated in the distance rod. The band is provided with a facing 20 of raybestos or other suitable material. One end of the band is provided with two eyes 21, and the other end is provided with a single eye 22 which is adapted to interlock with eyes 21, as shown in Fig. 2. As shown in the drawing the ends of the band are extended and the eyes are formed by cutting out metal at the edges and center of the respective ends, leaving strips which are bent over backward and secured to the band by rivets 23. If preferred the eyes may be made separate and riveted to the band. 24 denotes a shaft which is mounted to oscillate in eyes 21, one end of the shaft being reduced for convenience in assembling, and provided with a bushing 25, which lies in one of the eyes, the shaft being shown as secured in place by a pin 26 lying over a washer 27. The shaft is provided with an eccentric 28 which lies in eye 22. Near the end of the shaft opposite to the pin is an angular portion 29 which is engaged by the brake lever 30. 31 denotes the brake rod which is provided with a yoke 32 which straddles the free end of the brake lever and is pivoted thereto as at 33. The extreme end of the shaft is threaded and is engaged by a nut 34.

The operation is as follows: Pull upon the brake rod will swing the brake lever, which in turn will oscillate the shaft and cause the eccentric to force eye 22 forward relatively to eyes 21, that is the action will be to force the center of eye 22 slightly past the centers of eyes 21 and thus contract the brake band and cause the facing upon the band to grip the brake drum tightly. This gripping action in fact is, owing to the enormous leverage, much greater than can be produced by any brake mechanism now in use, so far as I am aware.

Having thus described my invention, I claim:

1. A brake comprising a band having interlocking eyes at its ends, a shaft mounted to oscillate in the eyes on one end of the band and having an eccentric lying in an eye on the other end of the band, one end of said shaft being reduced for the purpose set forth, a bushing on said reduced end which engages the corresponding eye, and a brake lever engaging the shaft.

2. A brake comprising a band having interlocking eyes at its ends formed by removing metal from the edges and center of the respective ends, leaving strips, and bending the strips over and riveting them to the band, and a shaft mounted to oscillate in the eyes on one end of the band and having an eccentric lying in an eye on the other end of the band.

In testimony whereof I affix my signature.

AXEL G. AHLGREN.

Copies of this patent may be obtained for five cents each, by addressing the "Commissioner of Patents, Washington, D. C."